United States Patent [19]

Hender

[11] 3,799,284
[45] Mar. 26, 1974

[54] DRIVE SYSTEMS
[76] Inventor: Berkeley Stephens Hender, The Meadows Llanvetherin, Abergavenny, England
[22] Filed: Oct. 30, 1972
[21] Appl. No.: 302,011

[30] Foreign Application Priority Data
Oct. 30, 1971  Great Britain..................... 50546/71

[52] U.S. Cl................ 180/65 A, 74/675, 74/750 R, 74/847, 318/8
[51] Int. Cl............................ B60l 15/20, B60k 1/02
[58] Field of Search............ 180/65 R, 60, 65 A, 62; 74/661, 665 R, 665 N, 665 M, 665 T, 665 S, 665 F, 750 R, 675, 843, 847, 793, 665 P; 318/8, 13

[56] References Cited
UNITED STATES PATENTS

| | | | |
|---|---|---|---|
| 1,984,830 | 12/1934 | Higley | 74/675 X |
| 2,047,050 | 7/1936 | Armington | 74/675 |
| 2,515,565 | 7/1950 | Mohl | 318/8 |
| 2,763,823 | 9/1956 | Symes | 318/8 |
| 3,161,083 | 12/1964 | Roe | 74/675 |
| 3,373,316 | 3/1968 | Palmer | 180/65 R X |
| 3,716,767 | 2/1973 | Kuriyama et al. | 180/65 R X |

FOREIGN PATENTS OR APPLICATIONS

| | | | |
|---|---|---|---|
| 182,281 | 6/1955 | Austria | 74/847 |
| 624,179 | 5/1949 | Great Britain | 180/65 A |
| 837,439 | 6/1960 | Great Britain | 180/65 R |

*Primary Examiner*—David Schonberg
*Assistant Examiner*—Milton L. Smith
*Attorney, Agent, or Firm*—Diller, Brown, Ramik & Wight

[57] ABSTRACT

A versatile drive system suitable for battery powered electric vehicles or other machinery employs two electric motors driving a respective rotatable element, such as a road wheel, or together driving a single rotatable element. The motors are interconnected through a reversing gear unit. The system includes a simple electrical control circuit, whereby a parameter such as the field of one or both motors is varied in response to an accelerator pedal or other control device, and is also controlled in response to an electrical parameter such as armature current. The motor armatures are connected in series with each other, and the arrangement is such that the motors can run at high speed even while the vehicle is stationary. In addition, the motors can be run up in an off-load condition one at a time, the second motor acting regeneratively while the first is running alone. A simple modification in which the system is hybridized with an internal-combustion or other engine, useful for example in vehicles running where exhaust fumes are not objectionable, is also described.

18 Claims, 8 Drawing Figures

DRIVE SYSTEMS

This invention relates to drive systems for driving a rotatable element at speeds variable continuously from standstill to maximum by means of electric motors; and to electrically powered vehicles incorporating such drive systems.

Expressed in greater detail, the kind of such a drive system with which this invention is concerned is one which includes a first electric motor having a first output shaft and a second electric motor having a second output shaft, said output shafts being operatively coupled with said rotatable element for driving the same, and said output shafts being coupled with each other through transmission means so arranged as, when said first output shaft is rotated, to permit said second motor to run with rotation of said second output shaft in a direction selectively corresponding to, or reversed with respect to, the direction of rotation of said first output shaft. Such a drive system will be referred to herein as a drive system of the kind specified.

A drive system of the kind specified is known in a form in which the two motor output shafts drive a single said rotatable element, in the form of a driven shaft, through a single common conventional epicyclic gear train, the planet carrier of which is fixed to one of the motor output shafts and the annular ring gear of the gear train is fixed to the other motor output shaft, the driven shaft being fixed to the sun wheel. If the driven shaft in such an arrangement is clamped to prevent rotation, and one of the motors is energised, it will drive the other motor in a reverse, that is to say in a generating mode. The current so generated may for example be dissipated in a resistance or used as part of the power supply to the motor which is running.

When the driven shaft is released for rotation, it begins to be rotated by the first motor, and as the driven shaft is thereby accelerated the second motor slows down, stops, and reverses so as to act as a motor. During normal running of the driven shaft it is thus rotated by both motors, and its speed may be varied over a wide range by adjusting the speed of the second motor even though the first motor is of a substantially constant-speed type.

In the prior art construction just described, it is necessary to provide a separate braking or clamping device to hold the driven shaft stationary. Furthermore, the speed of the driven shaft is directly dependent on the speed of one of the motors. However, such an arrangement is useful in some applications.

In electric vehicle construction it is often advantageous to provide a separate electric motor for each running wheel that is driven. It is also of advantage to increase the range of a battery-driven electric vehicle by providing a prime mover, such as an internal-combustion engine or gas turbine, or an alternating current electric motor taking power from a third rail or overhead wire, for example in a railway vehicle. The engine or turbine, if provided, may be employed to drive the vehicle in open country or elsewhere where exhaust fumes are not considered objectionable, so saving the battery for town use and also providing a means whereby the battery may be re-charged while the vehicle is running.

Control systems for a drive system of the kind specified tend to be somewhat complicated and expensive. Furthermore, specially designed items of equipment are usually needed, which again adds to the cost of the system.

One object of the present invention is to provide a versatile drive system of the kind specified which is readily adaptable for driving any desired number, from one upwards, of rotatable elements.

Another object of the invention is to provide a drive system of the kind specified which can be constructed using conventional components.

Another object is to provide a continuously variable speed control from standstill to full speed and vice versa, with the facility of the rotatable element or elements being able to remain stationary without being clamped or braked by separate braking means.

An important object of the invention is to provide a very simple, low cost, control means for the motors.

A further object of the invention is to provide a system of the kind specified in which differential action is provided between two driven members. In particular, an object is to provide full differentiation between the driving or running wheels of a pair of such wheels in an electrically powered vehicle.

Yet another object is to provide a drive system of the kind specified to which a prime mover (as hereinbefore discussed) may be applied simply by coupling it to a motor of the drive system.

A still further object is to provide a drive system of the kind specified which is regenerative.

Another object of the invention is to provide a drive system of the kind specified in which a wide variety of motor types may be employed, including homopolar types, and which is applicable to any desired or convenient voltage or current rating.

A further object still is to provide a versatile drive system of the kind specified which is readily adaptable for driving vehicles or other machinery.

According to the invention in one aspect, there is provided a drive system for driving at least one rotatable element at speeds variable continuously from standstill to maximum, including a first electric motor having a first output shaft, and a second electric motor having a second output shaft, said output shafts being operatively coupled with said at least one rotatable element for driving the same, and said output shafts being coupled with each other through transmission means so arranged as, when said first output shaft is rotated, to permit said second motor to run with rotation of said second output shaft in a direction selectively corresponding to, or reversed with respect to, the direction of rotation of said first output shaft, wherein the system includes control means comprising first means and second means both arranged for varying a first parameter of a said motor, said first means being responsive to an electrical further parameter of said motors and said second means being controllable independently of said first means, the arrangement being such that appropriate continuous variation of said first parameter can produce accelerating and decelerating torque variation in the second output shaft whilst at least one of the motors is running at a speed independent of the speed of the associated at least one rotatable element.

Preferably, said first and second electric motors are connected electrically in series, for example by connecting in series respective wound armatures of the motors.

The said first parameter is preferably the field of the said second electric motor or of both motors, the control means being connected with the second motor (or with the motors, as the case may be) so as to vary the field. This may be effected for example by connecting the control means with a field winding, if provided, of the motor concerned; or, in the case of a motor having permanent-magnet field excitation, by suitable conventional mechanical means such as a servomechanism for making appropriate adjustment of the permanent magnets or of magnetic shunts associated therewith in known manner.

The control means preferably comprise a pulse controller of the known kind which is a common constituent of both said first and second means of the control means. Such a pulse controller typically consists of a standard squarewave pulse generator effective to feed electrical pulses of variable amplitude or duration into the field winding of the motor or motors being controlled, whereby to control the mark/space ratio and so also to control its field strength. The pulse generator has two input connections; one to a suitable transducer responsive to the said further parameter, so that the pulse controller with the transducer and its associated input connection constitutes the abovementioned first means of the control means; and a second input connection, which may be a mechanical or electrical connection to a control device such as a manually operated lever or switch or a pedal, so that the pulse controller and its second input connection constitute the abovementioned second means of the control means.

The said further parameter is preferably motor armature current, the first means (for example the transducer mentioned above) of the control means being connected in the motor circuit so as to be responsive to the motor armature current.

It will be seen from the foregoing that the invention provides, for a drive system of the kind specified, a very simple and inexpensive control means which can be constructed from standard components. The control means can be operated to start up the first motor and run it up to speed in what is effectively an off-load condition with the said rotatable element or elements stationary since insufficient torque is generated to move them, the second motor being driven in a generating mode by the first motor (and thus being driven in reverse). The control means is such that upon appropriate operation of the abovementioned control device to start driving the rotatable element or elements, the second motor is excited in a motoring sense and thereupon stops, reverses and begins to rotate in the forward direction. Continued operation of the control device causes more power to be fed to the motors so that they will develop sufficient accelerating torque to drive the rotatable elements. The effect of the first means of the control means (e.g. control of the pulse controller in response to motor armature current) is to cause the two motors to behave in a similar or "matched" manner to each other during normal running, i.e., after both the first and the second motor have been started and are each producing a torque driving the rotatable elements.

It will also be realised that the invention provides a drive system in which the rotatable elements can be stationary while the motors are both running, it being necessary only to adjust the abovementioned first parameter, such as the fields of the motors, so as to produce a suitably increased output or driving torque, for the rotatable elements to start rotating. This is a most important facility since it enables the system to react substantially instantaneously to operation of the manual or pedal control device. This facility is especially valuable in the case of electrically powered vehicles where much starting and stopping in town traffic is required.

As to the mechanical parts of the drive system according to the invention, each of said first and second electric motors is preferably coupled with a respective at least one said rotatable element through first and second gear means respectively.

Preferably, the first and second output shafts are coupled with each other through transmission means comprising at least part of said first and second gear means and means including reversing third gear means coupling an element of said first gear means with an element of said second gear means.

The drive system according to the invention may include a prime mover and releasable coupling means connecting the primer mover to one of said first and second electric motors whereby to transmit driving torque to such motor.

Various embodiments of the invention will now be described by way of example, with reference to the accompanying drawings, of which.

Figure 1:
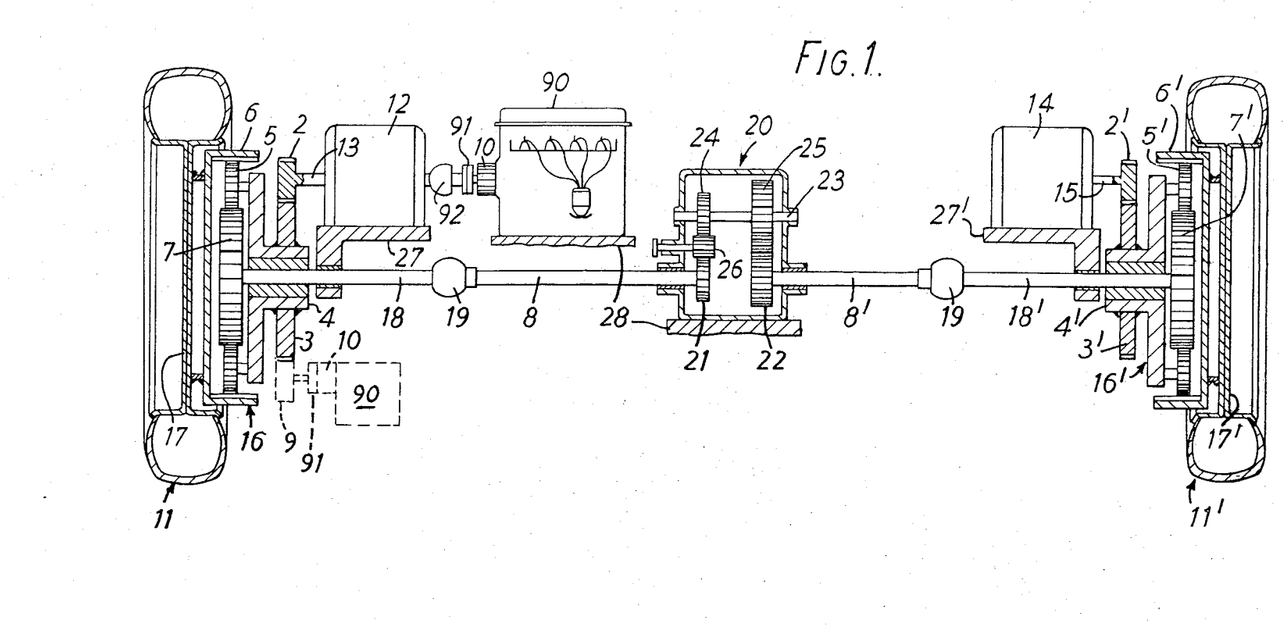
FIG. 1 is a very diagrammatic transverse sectional representation of mechanical parts of a drive system, in one embodiment of the invention, for an electrically powered road vehicle.

With reference first to FIG. 1, a road vehicle has a pair of rotatable elements in the form of road or running wheels 11, 11'. A drive system for driving the wheels 11, 11' at speeds variable continuously from standstill to maximum includes a first electric motor 12 having a first output shaft 13, and a second electric motor 14 having a second output shaft 15.

The output shaft 13 is operatively coupled with its associated wheel 11, for driving the wheel 11, through transmission means adapted to provide variation in transmission ratio. This transmission means consists, in respect of output shaft 13 and wheel 11, of a drive pinion 2 on the output shaft 13, a planet carrier 4 of an epicyclic gear train 16, and an annular ring gear 6 of the gear train 16. The planet carrier 4 carries a gear 3 engaging the pinion 2, and planet wheels 5 which engage the ring gear 6, the latter being fixed directly to the nave plate 17 of the wheel 11.

The output shaft 15 of motor 14 is similarly coupled with its associated wheel 11' through a drive pinion 2' on the shaft 15, a planet carrier 4' of an epicyclic gear train 16' generally identical to the gear train 16, and an annular ring gear 6' of this gear train, the ring gear 6' being fixed directly to the nave plate 17' of the wheel 11'.

Each gear train 16 16' also includes a sun wheel 7, 7' respectively, engaging the respective planet wheels 5, 5' of the gear trains. Each sun wheel 7, 7' is carried on a stub shaft 18 18' respectively, which is coupled through a constant-velocity universal joint 19 with a shaft 8, 8' respectively. The shaft 8 carries a gear wheel 21 of a reversing gear unit 20, and shaft 8' carries a gear wheel 22 of this gear unit. The gear unit 20 includes a layshaft 23 carrying two gear wheels 24, 25. The wheel 25 engages the wheel 22 on shaft 8' directly, whilst the wheel 24 engages the wheel 21 on shaft 8 through a reversing pinion 26.

Thus the output shafts 13, 15 are coupled with each other through transmission means comprising pinions 2, 2' respectively, gears 3, 3', planet carriers 4, 4', planet wheels 5, 5', sun wheels 7, 7', shafts 18, 18', shafts 8, 8', and reversing gear unit 20.

In this arrangement, the wheels 11, 11', epicyclic gear trains 16, 16', motors 12, 14 and shafts 8, 8', are all mounted on a subframe 27, 27', respectively, the subframes 27, 27' being secured to a main frame of the vehicle (indicated diagrammatically at 28) by conventional suspension means, not shown.

It can be seen that, if motor 12 is energised in a forward direction so as to rotate its output shaft 13, with insufficient power to generate enough torque to start rotating the wheel 11, consequent rotation of the planet carrier 4 causes the shaft 8 to rotate. This causes the shaft 8' to rotate in the reverse direction by virtue of the reversing gear unit 20, so rotating the output shaft 15 of motor 14 in the reverse direction so that the motor 14 then acts as a generator.

If, however, both motors 12, 14 are energised so as to run as motors in the forward direction at the same speed as each other, the planet carriers 4, 4' will be rotated in the same direction as each other and the shafts 8, 8' will be stationary. This is the condition during normal running of the vehicle. During normal running, variation of the power supplied to the motors, 12, 14 simultaneously will not cause the shafts 8, 8' to rotate.

It will thus be seen that when the first output shaft 13 is rotated, the transmission means by which the output shafts 13 and 15 are coupled together permits the second motor 14 to run with rotation of its output shaft 15 in a direction selectively corresponding to the direction of rotation of the output shaft 13 (in the normal running condition), or reversed with respect to this latter direction (in the condition wherein only the motor 12 is energised).

At the same time it will be seen that so long as one of the motors develops less torque than the other, the shafts 8, 8' will rotate in opposite directions. The effect of this is that if one of the motors begins to develop more torque than the other motor, the consequent rotation of the shaft 8 or 8' associated with the latter motor will cause it to run more slowly or even be reversed. It is therefore possible to start one motor in a condition which is effectively an off-load condition, except that it will be driving the other motor in reverse. Because this requires only a small output torque, it is thus possible to run one motor up to speed without such motor generating sufficient torque to drive its associated running wheel. The other motor can then be run up to speed — again effectively in an off-load condition — while the first is running. Once both motors are running at the same speed, the power input to the motors can be increased until they generate sufficient driving torque to drive the wheels 11, 11'.

Thus the drive system can be started without it being essential for the wheels 11, 11' to be braked to prevent their rotation. In addition, the motors can remain running while the vehicle is stationary, e.g. at traffic signals.

Figure 2:
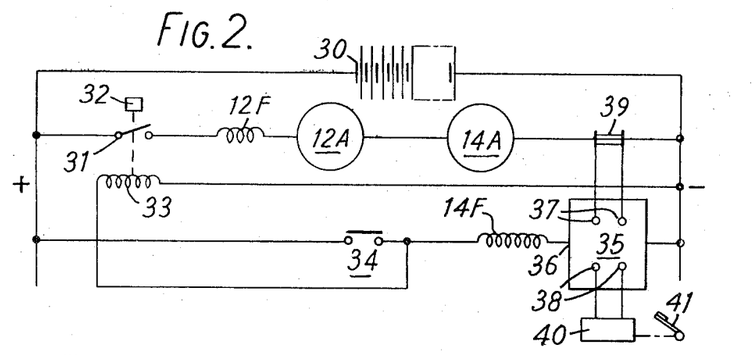
FIG. 2 is a diagram illustrating in one form the electrical part of the drive system.
Figure 3:
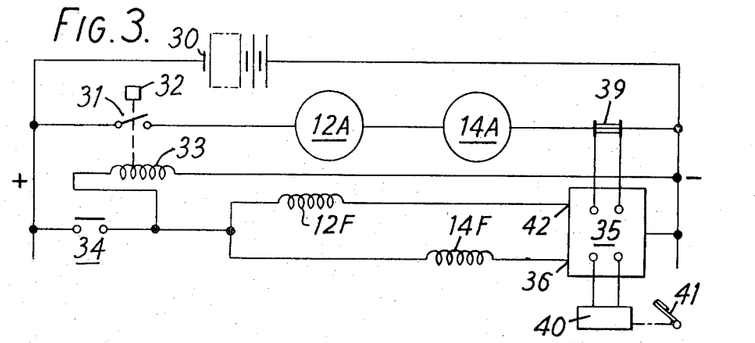
FIG. 3 is a diagram illustrating the electrical part of a drive system according to the invention in a modified form.
Figure 4:
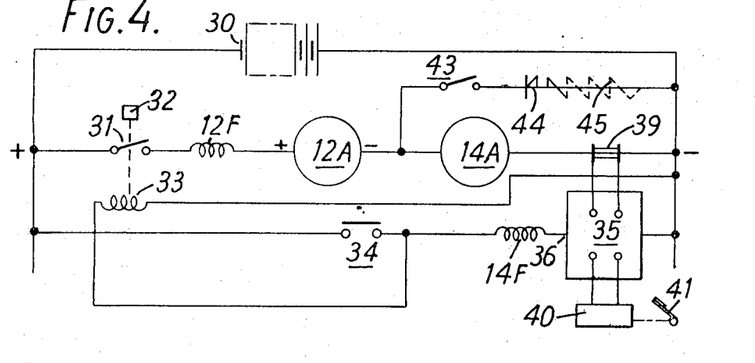
FIG. 4 is a diagram illustrating another modified form of the electrical part of a drive system according to the invention.

FIGS. 2 to 4 show electrical features of a system according to the invention such as that just described with reference to FIG. 1.

In FIG. 2, there are shown the wound armature 12A and field winding 12F of motor 12, and the wound armature 14A and field winding 14F of motor 14. In this embodiment, motor 12 is a series-wound D.C. motor and motor 14 is a shuntwound (separately excited) D.C. motor. The armatures 12A and 14A are connected in series with each other and with a battery 30 which constitutes the main power supply source of the vehicle. Also in series with the armatures is a circuit-braker 31 having a time-delay device 32 and operated by a coil 33 which is connected across the battery 30 and controlled by a main switch 34.

The field winding 14F of motor 14 is connected between the switch 34 and the output 36 of a pulse controller 35 in the form of a square-wave pulse generator, of conventional construction capable of varying the energy of each pulse by variation of pulse amplitude or duration in response to input signals received at input terminals 37 or 38 of the controller 35. The pulse controller 35 is powered from the battery 30.

The input terminals 37 are connected to a suitable transducer 39 for sensing the current in the motor circuit through the motor armatures 12A and 14A. The input terminals 38 are connected to a control device comprising a variable signal generating device 40 of any known suitable kind, which is controlled by an accelerator pedal 41 of the vehicle.

In the operation of the drive system as described with reference to FIGS. 1 and 2, starting with the motors stationary, the main switch 34 is closed to energise the coil 33 and so close the circuit breaker 31 under control of the time delay device 32. The pedal 41 is not depressed and no current is flowing in the field winding 14F of motor 14; but when the circuit breaker 31 is closed, current flows in the windings 12A, 12F of the motor 12, so starting the latter. The motor 12 then runs up to speed, in a substantially off-load condition as previously discussed herein, but running the motor 14 as a generator. Since the armature 14A of the latter is connected in series with that of the motor 12, it will be seen that the motor 14 acts regeneratively to feed current into the circuit, increasing the voltage across motor 12 and so reducing the net power taken from the battery 30. So long as the wheels 11 and 11' are stationary, the speed of motor 14 in reverse is the same as that of motor 12 in the forward direction.

When the motor 12 has been run up to speed, the pedal 41 is operated to cause the pulse controller 35 to feed pulses through the field winding 14F, so exciting the motor 14. This causes the motor 14 to slow down, stop and reverse into a direction of rotation the same as that of the motor 12. Continued application of the pedal 41 increases the field strength in the motor 12 so that both motors produce equal output torques, which increase until sufficient to cause the wheels 11 and 11' to rotate. The speed of the vehicle is thereafter controlled by the accelerator pedal 41.

The controller 35 is influenced by the current detecting transducer 39 in such a manner as to simulate a series condition between the field winding 14F and armature 14A of the motor 14, by regulating the pulsed output of the controller according to the current flowing in the armatures. In this way the characteristic of the motor 14 may be adjusted to suit any condition.

In particular, it will be appreciated that the system provides both mechanical and electrical differentiation between the two motors 12 and 14. As mentioned hereinbefore, when one motor gives a greater output torque than the other, the latter will tend to be reversed. Thus, with the control means shown in FIG. 2, deceleration of the vehicle is achieved by weakening the field of the motor 14, so that the shafts 8, 8', FIG. 1, will rotate in such a manner that the now-reduced total output of the two motors is shared between the two wheels 11, 11', so that when the total available output torque is reduced below the minimum value required for continued motion of the vehicle, the vehicle will stop.

The modified arrangement shown in FIG. 3 is the same as that shown in FIG. 2, except that the motor 12 is separately excited the field winding 12F of which is connected to a separate output 42 of the controller 35. The accelerator control device 40 affects the field of the motor 14 only, and that of motor 12. It will be seen that by varying the ratio of the current in field windings 12F and 14F, degress of speed control from standstill to maximum, and also regenerative braking capability, are achieved.

FIG. 4 shows a modification to the circuit of FIG. 2, though it is equally applicable to that of FIG. 3. During start-up conditions where the motor 12 is driving the motor 14 in reverse, the rising voltage across motor 12 may in some instances cause both motors to increase their speed, and runaway conditions might in some circumstances be experienced. To avoid this, as shown in FIG. 4, the armature 14A of motor 14 is short-circuited by a contactor 43 which may remain closed until sufficient output torque is built up to prevent runaway conditions, or for so long as the motor 14 runs in reverse.

The contactor 43 may be replaced by, or as in FIG. 4, supplemented by, a diode 44 so connected as to conduct current while the machine 14 is running as a generator in reverse. The contactor 43 is preferably retained to prevent residual magnetism in the motor 14, causing current to flow in the diode 44 during initial switching on of the current by the circuit breaker 31, and so to prevent unwanted output torque being produced by the motors.

If required, a resistance 45 or a battery (not shown) for auxiliary equipment such as lighting, may be provided to load the motor 14.

From the foregoing it will be seen that any one of the arrangements shown in FIGS. 2 to 4 provides, in a drive system as described with reference to FIG. 1, a control means comprising a first means (transducer 39 and controller 35) and a second means (pedal 41, signal generator 40 and controller 35) both arranged to vary a first parameter, in this case the field, of the motor 14; the first means being responsive to an electrical further parameter, in this case the armature current, of the motors; and the second means being controllable by the pedal 41 independently of the first means. The arrangement is such, as has been explained, that appropriate continuous variation of the field of motor 14 can produce accelerating and decelerating torque variation in the output shaft 15 of motor 14, whilst at least one of the motors is running at a speed independent of the speed of the wheel 11 or 11' associated therewith, for example while the motor 14 is being run up to speed preparatory to starting forward movement of the vehicle, or during deceleration when the motor 14 is running at a speed independent of the speed of wheel 11', the wheels 11, 11' being then driven by the motor 12 as explained above.

It is important to note that, when both motors are fully energised, their characteristics will be similar (in both FIGS. 2 and 3 the transducer 39 and controller 35 act to ensure that both motors behave under these conditions as series-wound motors); and that the total power available is the sum of the power outputs of the two motors.

Figure 5:
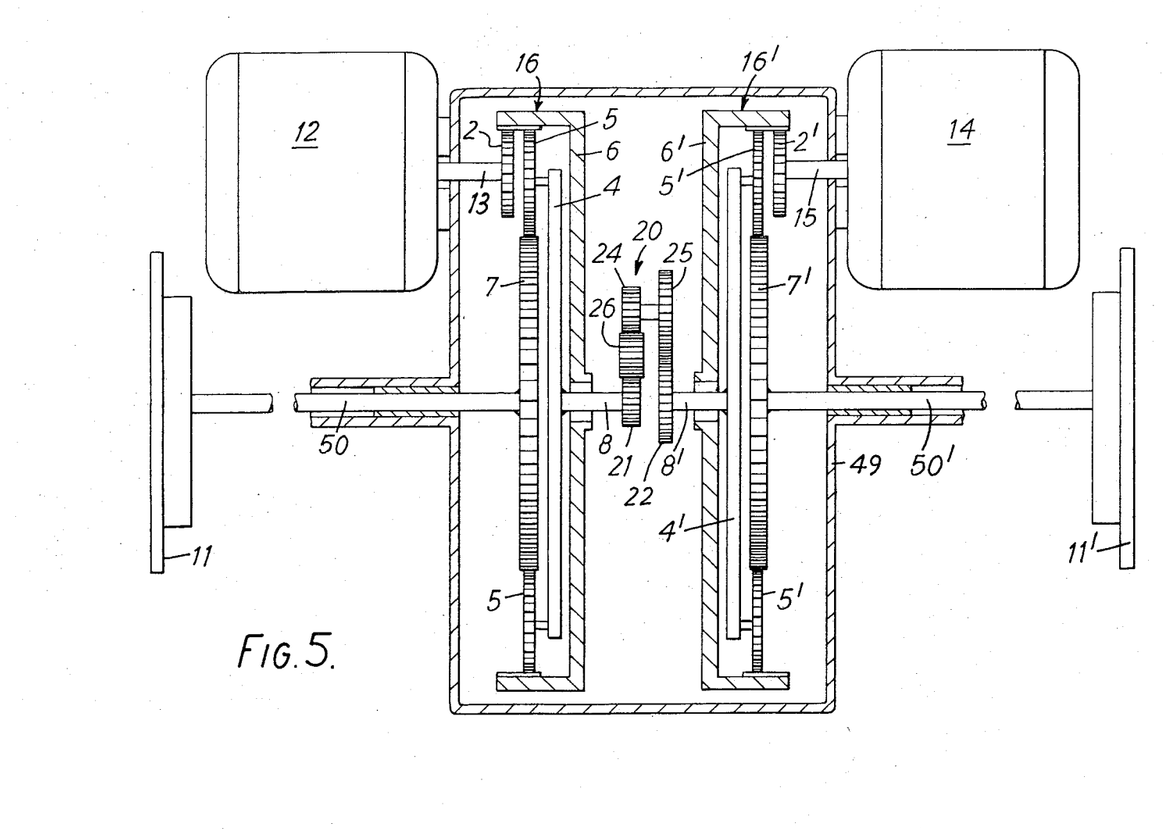
FIG. 5 is a very diagrammatic transverse sectional representation of mechanical parts of a drive system according to the invention in a modified embodiment.

The arrangement shown in FIG. 5 is similar in principle to that shown in FIG. 1, but in this case the epicyclic gear trains 16, 16' and the reversing gear unit 20 are all housed in a single casing 49 on which the motors 12 and 14 are mounted. The casing 49 is in the main frame of the vehicle, and the components mounted in or on it are therefore not part of the unsprung weight of the vehicle.

In FIG. 5 the shafts 8, 8' are shown connected to the planet carriers 4, 4' respectively, whilst the motor output shaft pinions 2, 2', drive the annular gear rings 6, 6' respectively and the sun wheels 7, 7' are mounted on final drive shafts 50, 50' carrying the wheels 11, 11' respectively. In both FIGS. 1 and 5 the transmission between the output shaft 13 or 15 and its associated wheel 11 or 11' comprises three elements of the associated epicyclic gear train 16 or 16'. In FIG. 1 these three elements are the planet carrier, planet wheels and ring gear; in FIG. 5 they are the ring gear, planet wheels and sun wheel. The fourth element of the epicyclic gear train, namely the sun wheel in FIG. 1 and the planet carrier in FIG. 5, is, as can be seen, rotatably coupled with an element of the reversing gearbox.

Figure 6:
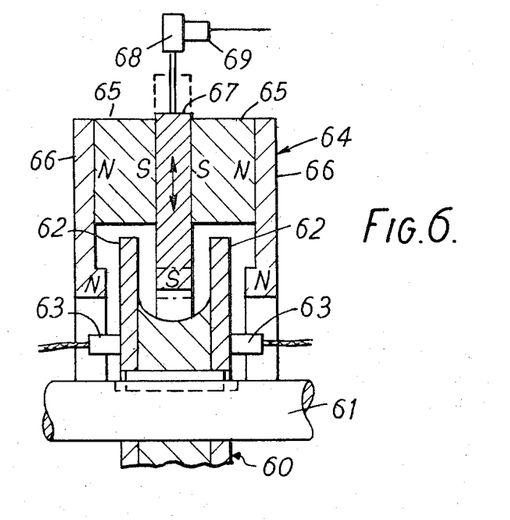
FIG. 6 is a simplified sectional view showing part of a homopolar motor suitable for use in a drive system according to the invention in place of a motor represented in FIGS. 2 to 4.
Figure 7:
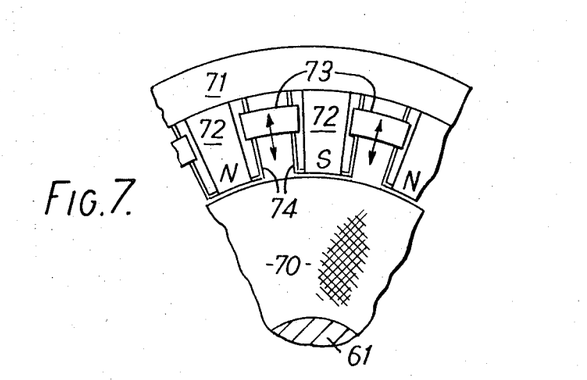
FIG. 7 is a simplified diagram showing part of another form of motor suitable for use in place of a motor as represented in FIGS. 2 to 4 or FIG. 6.

At least one of the motors may be of a kind having permanent-magnet field excitation. Preferably both motors are of such a kind, two known examples of which are shown in FIGS. 6 and 7. The homopolar motor shown in FIG. 6 has a rotor 60 on the motor shaft 61 (i.e., output shaft corresponding for example to shaft 13 or 15, FIG. 1), the rotor 60 being an armature including a pair of discs 62 acting in the manner of slip rings in engagement with brushes 63 for feeding motor current through the rotor. The ring-like stator 64 comprises two sets of brick-type permanent magnets 65 arranged in annular configuration between fixed outer soft-iron pole pieces 66 and separated by movable soft-iron pole pieces 67 arranged in annular configuration and movable radially by any suitable means, for example a set of the conventional servo actuators one of which is indicated at 68 and each operated by an electrical actuating device 69, FIGS. 2 to 4. In this instance the device 69 will be such as to cause the pole pieces 67 to move radially, as appropriate, to vary the field of the motor in response to changes in 16'. amplitude and/or duration of three control electric signals.

The motor of which a portion is shown in FIG. 7 is a variable field permanent magnet motor, of the kind described fully in my British Pat. specification No. 1,133,797, and need not be described here more than briefly. The wound armature 70 is encircled by a stator frame 71 carrying permanent magnet pole pieces 72 which are separated by gaps in which soft iron shunt members 73 are slidable radially on guides 74, to vary the field, controlled for example by a set of servo actuators arranged and operated as just described with reference to FIG. 6.

Figure 8:
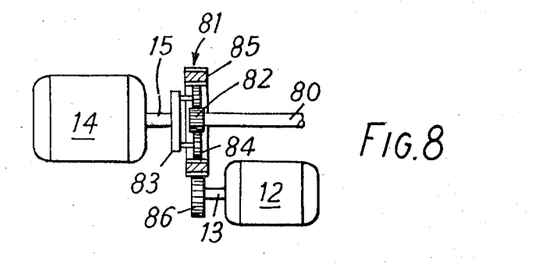
FIG. 8 is a simplified view showing one application of the invention to a system having a single driven shaft.

FIG. 8 illustrates part of a drive system in which, in place of two motors driving a pair of respective rotatable members such as the running wheels 11, 11' in FIGS. 1 and 5, the two motors 12, 14 drive a common single rotatable member in the form of a driven shaft 80 through a single conventional epicyclic gear train 81. The latter consists of a sun wheel 82, planet carrier 83, carrying planet wheels 84, and an annular ring gear 85. In the arrangement shown, the ring gear 86 is driven by pinion 86 on the output shaft 13 of the motor 12, and the planet carrier 83 is fixed on the output shaft 15 of the motor 14. An arrangement of this type as discussed earlier herein, is known per se. The present embodiment of the drive system according to the invention comprises the arrangement of FIG. 8 with one of the novel electrical arrangements described hereinbefore with reference to FIGS. 2 to 4.

Reverting now to FIG. 1, there is shown therein a prime mover comprising an internal-combustion engine 90, coupled by a disengageable clutch 91, gearbox 10, and a constant-velocity universal joint 92, to the motor 12. The engine 90 is optional, but for reasons discussed hereinbefore it is advantageous to provide it.

When the engine is running more or less at constant speed under the influence of its own governor, the control of the vehicle will be the same as if it were being run as a pure electric drive.

The clutch 91 may be of any suitable kind, for example a one way (sprag) clutch. The variable-speed gearbox 10 may in some cases be unnecessary. It may be provided be a conventional change gearbox.

Alternatively the engine 90 may be coupled into the drive system (for example to the motor 12) by a hydraulic torque converter.

An alternative arrangement for a drive system incorporating an optional prime mover such as the engine 90 is indicated in FIG. 1 in dotted lines. In this case the engine 90 is coupled through the gearbox 10 and clutch 91 to a gear 9 driving the gear 3 of planet carrier 4 in parallel with the motor 12.

The engine 90 may be disconnected from the remainder of the drive system by operation of the clutch 91, or torque convertor, leaving the vehicle to be driven by the motors 12, 14 powered by the battery 30 as hereinbefore described.

When coupled into the drive system, the engine 90 assists the motor 12, and can indeed drive both motors 12, 14 if required so that they run as generators to regenerate and to recharge the batteries while the vehicle is at standstill or running at reduced power, the controller 35 being of a kind suitably adapted to give the motors a suitable charging characteristic.

In place of the engine 90, there may for example be a flywheel, or a gas turbine, or an alternating current electric motor which may for example be arranged to collect current from a conductor rail or overhead wire.

Numerous variations on the embodiments described herein are possible within the scope of the invention. A few examples of such variations will now be mentioned.

It will be evident that in place of the epicyclic gear trains 16, 16' there may be provided other known kinds of fixed ratio transmission between the motors 12, 14 and their associated wheels 11, 11'. Also the shafts 8, 8' may be coupled with the motors 12, 14 through other known kinds of gear.

In place of any of the constant velocity universal joints 19, 92, flexible couplings may be used, or, in place of the joints 19, a conventional half shaft arrangement to convey the driving torque to the wheels. This latter arrangement would for example be suitable in the embodiment shown in FIG. 5.

The use of a pulse controller as described herein is not essential; the field may for example be varied by use of conventional devices such as variable resistances such as carbon stacks or rheostats.

The system is not restricted to two motors; the electrical circuits shown in FIGS. 2 to 4 may be used, with suitable variation of the mechanical features of the drive, to control a multiplicity of motors arranged to function in the manner described.

A single driven shaft arrangement such as that shown in FIG. 8 may if desired be used to drive a plurality of further rotatable members, such as running wheels of a vehicle, through a suitable final drive such as a differential gearbox.

An arrangement such as those shown in FIGS. 1 and 5 may be used for driving a single rotating member by coupling the outputs (ring gears 6, 6', FIG. 1; sun gears 7, 7'', FIG. 5) together, by, for example, a layshaft.

Drive systems according to the invention can be used with any form of machinery for which they may be found suitable, and not only for vehicles.

I claim:

1. A drive system for driving at least one rotatable element at speeds variable continuously from standstill to maximum, including a first electric motor having a first output shaft, and a second electric motor having a second output shaft, said output shafts being operatively coupled with said at least one rotatable element for driving the same, and said output shafts being coupled with each other through transmission means so arranged as, when said first output shaft is rotated, to permit said second motor to run with rotation of said second output shaft in a direction selectively corresponding to, or reversed with respect to, the direction of rotation of said first output shaft, wherein the system includes control means comprising first means and second means both arranged for varying a first parameter of a said motor, said first means being responsive to an electrical further parameter of said motors and said second means being controllable independently of said first means, the arrangement being such that appropriate continuous variation of said first parameter can produce accelerating and decelerating torque variation in the second output shaft whilst at least one of the motors is running at a speed independent of the speed of the associated at least one rotatable element.

2. The drive system according to claim 1, wherein said first and second electric motors are connected electrically in series.

3. A drive system according to claim 2, wherein each electric motor has an armature, and said first means of the control means is connected in the motor circuit so as to be responsive to motor armature current constituting said further parameter.

4. A drive system according to claim 2, including electrical switching means in parallel with said second electric motor and arranged to remain closed in response to a condition wherein the second output shaft is rotating in a direction reversed with respect to the direction of rotation of said first output shaft.

5. A drive system according to claim 1, wherein each of said first and second electric motors has a wound armature, said armatures being connected electrically in series.

6. A drive system according to claim 1, wherein said electric motors each has a field, and said control means is connected to said second electric motor so as to vary the field, constituting said first parameter thereof.

7. A drive system according to claim 6, wherein said control means is connected to both of said electric motors so as to vary the fields thereof.

8. A drive system according to claim 7, wherein said control means is connected with a field winding of each of said electric motors, said electric motors being of the separately excited kind.

9. A drive system according to claim 6, wherein said control means is connected with a field winding of said second electric motor, said second electric motor being of the separately excited kind.

10. A drive system according to claim 1, wherein said control means comprise a pulse controller which is common to both said first and second means of the control means.

11. A drive system according to claim 1, wherein said first electric motor is series wound.

12. A drive system according to claim 1, wherein at least one of said electric motors is of a kind having permanent-magnet field excitation.

13. A drive system according to claim 1, wherein each of said first and second electric motors is coupled with a respective at least one said rotatable element through first and second gear means respectively.

14. A drive system according to claim 13, wherein the first and second output shafts are coupled with each other through transmission means comprising at least part of said first and second gear means and means including reversing third gear means coupling an element of said first gear means with an element of said second gear means.

15. A drive system according to claim 14, wherein each of said first and second gear means includes an epicyclic gear arrangement each of which comprises a train of three elements of an epicyclic gear train of four elements, namely a sun wheel; a planet carrier; at least one planet wheel engaging the sun wheel and carried by the planet carrier; and an annular gear ring engaging the planet wheel, the fourth said element of each said gear train being rotatably coupled with an element of said third gear means.

16. A drive system according to claim 1, including a prime mover and releasable coupling means connecting the prime mover to one of said first and second electric motors whereby to transmit driving torque to such motor.

17. A drive system according to claim 16, wherein the prime mover is an internal-combustion engine.

18. An electrically powered vehicle incorporating a drive system according to claim 1, wherein said rotatable elements are running wheels of the vehicle, each wheel of at least one pair of said wheels being operatively coupled to a respective one of said first and second output shafts, and said second means of the control means being coupled to an accelerating and decelerating control device of the vehicle for actuation thereby.

* * * * *